(12) United States Patent
Weigand

(10) Patent No.: US 10,606,303 B2
(45) Date of Patent: Mar. 31, 2020

(54) CONTROL LEVER FOR A VEHICLE

(71) Applicant: AGCO International GmbH, Neuhausen (CH)

(72) Inventor: Jan Weigand, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 115 days.

(21) Appl. No.: 15/787,428

(22) Filed: Oct. 18, 2017

(65) Prior Publication Data
US 2018/0107236 A1 Apr. 19, 2018

(30) Foreign Application Priority Data

Oct. 19, 2016 (GB) .................................... 1617661.2

(51) Int. Cl.
| | | |
|---|---|---|
| *G05G 9/047* | (2006.01) | |
| *B60K 37/06* | (2006.01) | |
| *A01B 71/02* | (2006.01) | |
| *B62D 1/12* | (2006.01) | |
| *E02F 9/20* | (2006.01) | |

(Continued)

(52) U.S. Cl.
CPC ......... *G05G 9/04792* (2013.01); *A01B 71/02* (2013.01); *B60K 37/06* (2013.01); *B62D 1/12* (2013.01); *E02F 9/2012* (2013.01); *G05G 1/04* (2013.01); *B60K 2370/122* (2019.05); *B60K 2370/131* (2019.05); *B60K 2370/135* (2019.05); *B60K 2370/139* (2019.05); *B60K 2370/1537* (2019.05); *B60K 2370/61* (2019.05); *B60K 2370/736* (2019.05); *B60K 2370/744* (2019.05); *B60Y 2200/22* (2013.01);

(Continued)

(58) Field of Classification Search
CPC .. G05G 9/04788; G05G 9/04792; G05G 1/04; E02F 9/2012; B60K 37/06; B60K 2350/2004; B60K 2350/1048; B60K 2350/1016; A01B 71/02; B62D 1/12; F16H 2059/0282
See application file for complete search history.

(56) References Cited

U.S. PATENT DOCUMENTS 5,261,291 A * 11/1993 Schoch ................... B60K 37/06
180/333
5,567,004 A * 10/1996 Pietzsch ................. B60K 35/00
180/326

(Continued)

FOREIGN PATENT DOCUMENTS

| EP | 2428385 A2 | 3/2012 |
| EP | 2965937 A1 | 1/2016 |

(Continued)

OTHER PUBLICATIONS

European Patent Office, International Search Report for related EP application No. 17197042, dated Feb. 26, 2018.

(Continued)

*Primary Examiner* — Frank B Vanaman

(57) ABSTRACT

A vehicle control lever which has a moveable control panel provided on the lever. The control panel has a plurality of operating elements to control different vehicle functions, wherein the configuration of the operating elements can be re-assigned to control different vehicle functions based on the position of the control panel on the control lever.

11 Claims, 6 Drawing Sheets

(51) Int. Cl.
*G05G 1/04* (2006.01)
*F16H 59/02* (2006.01)

(52) U.S. Cl.
CPC ... *B60Y 2200/41* (2013.01); *F16H 2059/0282* (2013.01); *G05G 2009/04774* (2013.01)

(56) References Cited

U.S. PATENT DOCUMENTS

| | | | | |
|---|---|---|---|---|
| 7,002,089 | B2* | 2/2006 | Stevenson | H01H 13/702 200/312 |
| 7,113,228 | B1* | 9/2006 | Boll | H04N 5/262 345/173 |
| 2002/0046895 | A1* | 4/2002 | Kaneda | B62D 11/183 180/410 |
| 2002/0085045 | A1* | 7/2002 | Vong | G06F 3/0481 715/840 |
| 2003/0052514 | A1* | 3/2003 | Schmidt | B60K 37/06 296/153 |
| 2005/0279561 | A1* | 12/2005 | Shearer | E02F 3/7663 180/333 |
| 2006/0017326 | A1* | 1/2006 | Hein | B60K 35/00 307/10.1 |
| 2006/0113141 | A1* | 6/2006 | Ackermann | B60N 2/14 180/326 |
| 2006/0137931 | A1 | 6/2006 | Berg et al. | |
| 2008/0249668 | A1* | 10/2008 | Miyata | B60K 37/06 701/1 |
| 2010/0320022 | A1 | 12/2010 | Klas et al. | |
| 2014/0083225 | A1* | 3/2014 | Downs | B60K 37/06 74/471 XY |
| 2015/0002404 | A1* | 1/2015 | Hooton | B62D 1/046 345/173 |

FOREIGN PATENT DOCUMENTS

| | | |
|---|---|---|
| GB | 2460658 A | 12/2009 |
| JP | H09 128085 A | 5/1997 |
| WO | 91/06903 A | 5/1991 |
| WO | 92/03774 A | 3/1992 |

OTHER PUBLICATIONS

UK Intellectual Property Office, International Search Report for Priority Application No. GB1617661.2, dated Mar. 31, 2017.

* cited by examiner

CONTROL LEVER FOR A VEHICLE

BACKGROUND

Field of Invention

The present invention relates to a control lever for a vehicle, and a vehicle having such a control lever, in particular an agricultural vehicle.

Description of Related Art

Some vehicles, particularly in the area of agriculture and construction, are provided with a number of different vehicle components for operation by a vehicle operator. As a result, such vehicles are generally provided with a variety of different control devices for the control and operation of the different vehicle components. An example of such a control device is a control lever or joystick-style controller, which may be used for vehicle steering and acceleration, as well as for operation of different vehicle elements, e.g. lifting devices such as buckets, backhoes, front loaders, etc.

In an effort to improve the efficiency of operation, may control levers are provided with additional operating elements, e.g. additional buttons, rotary dials, etc., which are associated with different vehicle components. The provision of such operating elements on the control lever itself allows for the operator to control a wider variety of vehicle components, without removing their grip from the control lever.

However, such a pre-defined layout of operating elements may not be appropriate for all operators of the control lever, as a "one-size-fits-all" approach is not suitable when considering factors such as different operator hand sizes, comfort requirements, and even the personal preference of the operator for the layout of vehicle controls.

In addition, while the different operating elements themselves may be re-assignable to control different vehicle components, such re-assignment can require the operator to re-select the different assignments from a user interface terminal, thereby requiring the operator to remove their grip from the control lever to perform the re-assignment.

As a result, it is an object of the invention to provide a control lever for a vehicle having improved comfort and flexibility of operation.

SUMMARY

Accordingly, there is provided a control lever for a vehicle, the control lever comprising:

a lever body having a gripping surface for a hand of an operator, the lever body having a base end and an upper end, and a control panel mounted to said lever body, the control panel having configurable operating elements provided thereon, the control panel moveable about the lever body, wherein the operating elements of the control panel are configured based at least in part on the position of the control panel relative to the lever body.

The position of the control panel on the lever body is adjustable about the lever body, to provide a vehicle control lever which is more flexible for use. The position of the control panel can be adjusted as required by the operator, e.g. based on operator comfort, operator handedness, visibility, etc. The operating elements are configured to actuate or control different components of the vehicle. As the control panel position can be changed, accordingly the configuration of the operating elements of the control panel can be changed based on the adjusted control panel position. As a result, the layout of the operating elements on the control panel as presented to an operator can be substantially unchanged, even though the position of the control panel itself may vary. This provides an adjustable control lever which is easier to use by an operator.

Preferably, the configurable operating elements of the control panel are configured according to a layout of different operating functions controlled by the operating elements, wherein the layout of operating functions is changed based on the position of the control panel relative to the lever body.

The layout may comprise any known conventional component layout, e.g. four-way directional controls, keypad controls, etc., wherein the layout as applied to the operating elements of the control panel is adjusted based on the control panel position. Accordingly, the layout of the controls as presented to the operator may remain substantially unchanged, or having the same relative orientation, regardless of the actual position of the control panel itself.

In an additional or alternative aspect, the operating elements are configured to control a plurality of a number of vehicle components, wherein the particular vehicle components controlled by the operating elements of the control panel are selected based on the position of the control panel relative to the lever body.

For example, in one position of the control panel, the operating elements of the control panel are configured to control one subset of components of the vehicle, e.g. hydraulic actuators. In a different position of the control panel, the operating elements of the control panel can be configured to control a different subset of components of the vehicle, e.g. a vehicle radio, a navigation system, a telephone interface, etc. Such an adjustable assignment of the functions controlled by the control panel by repositioning of the panel relative to the control lever body allows for a simple mechanism for an operator to switch between the controlling of different vehicle functions using the control panel of the control lever, without releasing their grip from the control lever.

In a preferred embodiment, the operating elements comprise assignable operating elements, such that the operating elements can be re-assigned to control different components of the vehicle, wherein the assignment of operating elements to different components is based at least in part on the position of the control panel on the lever body.

Preferably, the control lever comprises at least one sensor arranged to detect the orientation of the control panel relative to the lever body, wherein the assignment of the operating elements is based on the detected orientation.

It will be understood that the control lever may be provided with an integral controller or electronic control unit (ECU) to assign the operating elements to control or actuate different components of the vehicle. Alternatively, the control lever may be arranged to interface with a vehicle controller or ECU, such that the vehicle controller or ECU performs the re-assignment of the operating elements of the control lever to the different components of the vehicle.

In one aspect, a plurality of the assignable operating elements are assigned to control directionally-related components of the vehicle, wherein said plurality are re-assigned based on the orientation of the control panel when the control panel is moved about the lever body, such that the relative positions of the re-assigned operating elements corresponds to the relative directions of the associated/assigned components.

The directionally-related components of the vehicle may comprise any vehicle component the operation of which is related to a direction, e.g. a left-right steering operation, a forward-reverse extension or travel of a component or attached implement, a raising or lowering of a component or attached implement, etc. Accordingly, the re-assignment of the operating elements based on the orientation of the control panel allows for a vehicle operator to be presented with a layout of operating elements which corresponds with the associated directions of the controlled components.

Additionally or alternatively, the operating elements are assigned according to a template controller layout, wherein the operating elements are re-assigned based on the orientation of the control panel when the control panel is moved about the lever body, such that an operator is presented with a corrected assignment of operating elements substantially corresponding to the template controller layout.

The operating elements may be initially assigned based on a pre-defined or user-defined layout of controls, where the operating elements are re-assigned to continue to present the desired layout, regardless of the orientation of the control panel. For example, the operating elements may be configured to provide a keyboard or numeric keypad input, wherein the controls are re-assigned as the control panel is moved to continually present the default input layout regardless of orientation.

Preferably, the control panel is positioned towards the upper end of the lever body, wherein the control panel is rotatable about at least a portion of the circumference of the lever body.

Preferably, the control lever comprises a head section provided at the upper end of the lever body, wherein the control panel is rotatable about at least a portion of the head section of the control lever.

Preferably, the control lever comprises at least one additional operating element. The at least one additional operating element may be provided on the lever body, and/or provided on the head section of the control lever.

Additionally or alternatively, the position of the lever body is adjustable along at least a portion of the length of the lever body, between the base end and the upper end of the lever body.

Preferably, the control panel is lockable in position on the lever body. Preferably, the control lever comprises a locking device, which can be operated to secure the control panel in position on the lever body. Such a locking device may comprise a simple push-button tab or sliding switch which prevents relative movement between the control panel and the lever body. It will be understood that the control panel may be moveable during driving or movement of the vehicle, as part of a situative adjustment.

It will be understood that the operating elements of the control panel may comprise buttons, rotary dials, scroll wheels, cross-gate levers, mini-joysticks or thumbsticks, etc.

In one aspect, the control panel comprises a display screen to indicate the configuration of the operating elements.

Providing a display screen at the control panel allows the operator to easily see the current configuration of the operating elements.

Additionally or alternatively, the operating elements of the control panel comprise changeable indicators which indicate the current configuration of the operating elements.

For example, the indicators may comprise colour-changing lights, wherein different functions of the operating elements can be denoted by different colours of the colour-changing lights.

Additionally or alternatively, the operating elements comprise individual display screens incorporated into the operating elements, wherein the individual display screens display an indication of the function currently controlled by each operating element.

The operating elements may incorporate display screens or have display screens provided directly adjacent the operating elements, the screens arranged to display icons or other indications of the currently-controlled function or actuatable element. The screens may comprise LCD or LED screens.

There is further provided a vehicle, preferably an agricultural vehicle or constructional vehicle, preferably an agricultural tractor or harvester, having a control lever as described above.

BRIEF DESCRIPTION OF THE DRAWINGS

Embodiments of the invention will now be described, by way of example only, with reference to the accompanying drawings, in which.

The drawings are provided by way of reference only, and will be acknowledged as not to scale. Common features between the different embodiments are provided with the same reference numbers incremented by steps of 100.

DETAILED DESCRIPTION

Figure 1:
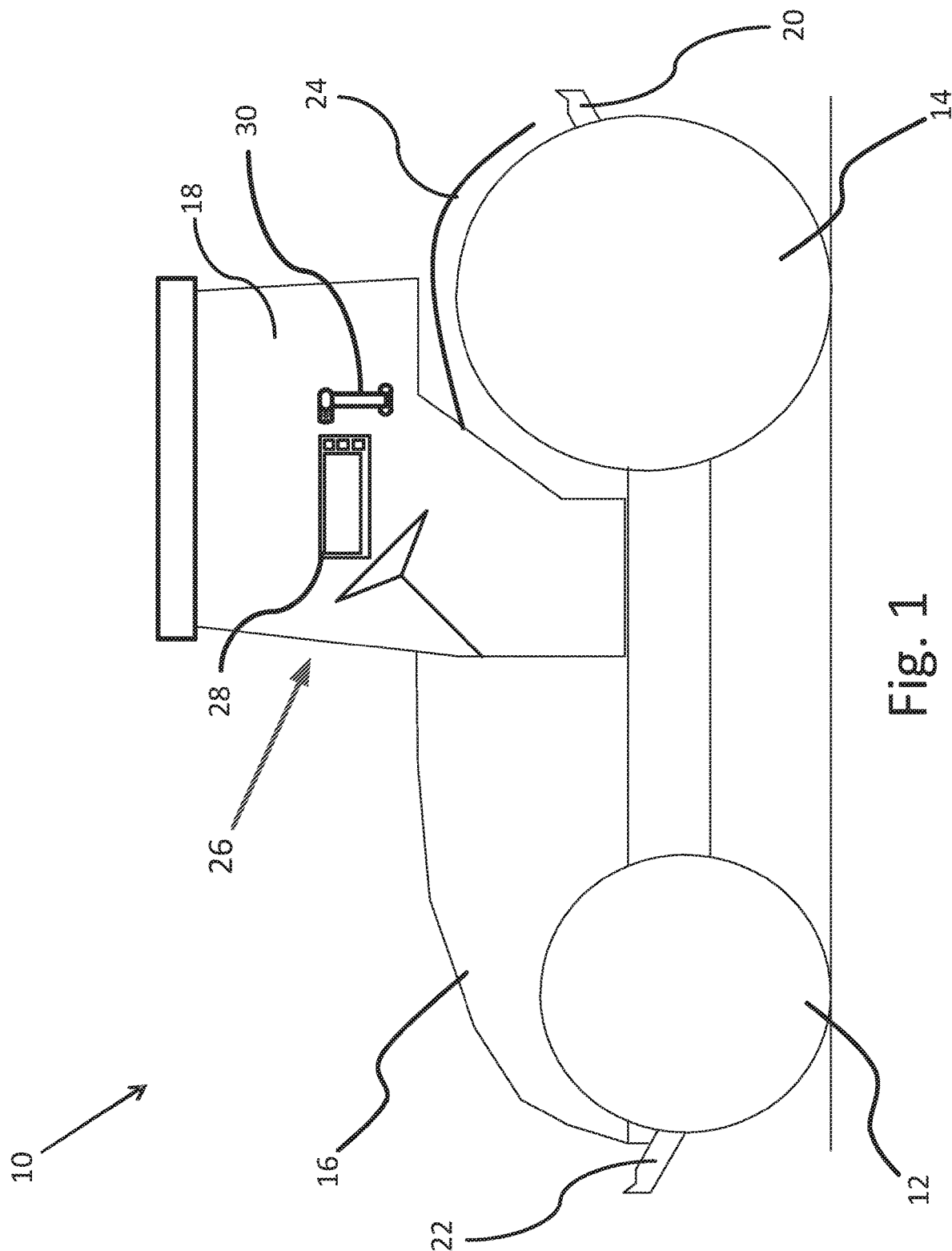
FIG. 1 is a side view of an agricultural tractor having a control lever according to the invention.

With reference to FIG. 1, a vehicle according to the invention in the form of an agricultural tractor is indicated at 10. The tractor 10 comprises front wheels 12 and rear wheels 14, a forward engine section 16 and a cab section 18. A rear linkage 20 is provided at the rear of the tractor 10, and a front linkage 22 is provided at the front of the tractor 10. The front and rear linkages 20, 22 can be actuated or moved using associated hydraulic cylinders. Rear fenders 24 are provided to cover a portion of the rear wheels 14.

Within the cab 18, an operator station 26 is provided. The operator station 26 comprises a user interface device 28 which is used to display information relating to tractor operation, and to control different elements of the tractor 10. The operator station 26 is provided with a control lever 30, which can be used to operate different elements of the tractor 10, e.g. hydraulic circuits, lifting systems, and/or to control the acceleration and steering of the tractor 10.

Figure 2A:
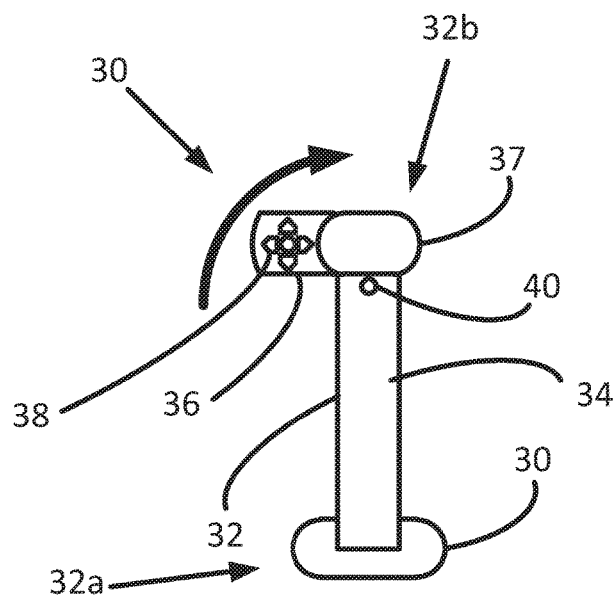
FIGS. 2A, 2B, and 2C illustrate an embodiment of control lever having a moveable control panel according to the invention, showing the control panel in three different positions on the control lever.
Figure 2B:
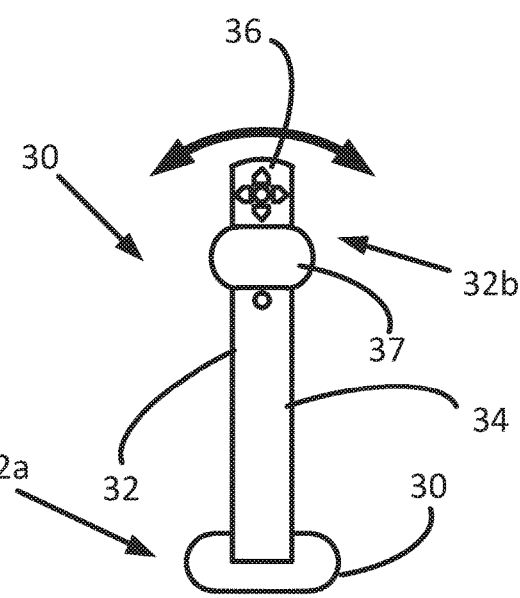
Figure 2C:
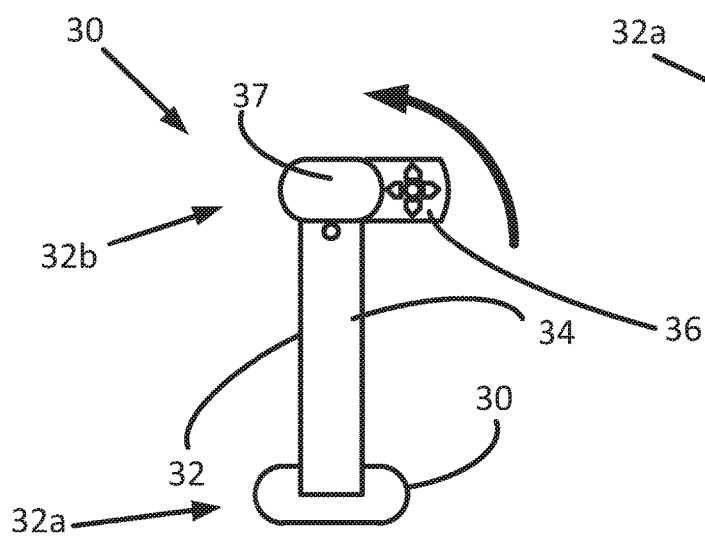

With reference to FIGS. 2A-2C, the control lever 30 is shown in more detail. The control lever 30 comprises a lever body 32 having a base end 32a and an upper end 32b. The lever body 32 has a gripping surface 34 for gripping by a hand of an operator. A control panel 36 is provided at the upper end 32b of the lever body 32. A plurality of operating elements 38 in the form of pushbuttons are arranged on the control panel 36, such that the operating elements 38 can be used to control different components of the tractor 10. The operating elements 38 can be used to control actuation of different hydraulic or pneumatic systems, for example a lifting circuit for a front loader or a front or rear linkage 20, 22. The operating elements 38 may also be configured to control the operation of different implements or attachments coupled with the tractor 10, e.g. cultivation or application equipment such as ploughs, sprayers, etc. Additionally or alternatively, the operating elements 38 can be used to control operation of different electronic or software-based subsystems of the tractor 10, e.g. a vehicle radio, a navigation system, a telephone interface, etc.

The control panel 36 is moveable on the lever body 32, such that the position of the control panel 36 relative to the lever body 32 can be adjusted by an operator. Preferably, the control panel 36 is rotatable about the upper end 32b of the lever body 32. Further preferably, the control panel 36 is rotatable about a head section 37 provided at the upper end 32b of the lever body 32.

In FIG. 2A, the control panel 36 is positioned to the left of the upper end 32b of the lever body. The control panel 36 can be rotated about the upper end 32b, to a further position shown in FIG. 2B, wherein the control panel 36 is positioned above or in front of the upper end 32b of the lever body 32. From here, the control panel 36 can be returned to the left-sided position as shown in FIG. 2A, or can be rotated further to the position shown in FIG. 2C, wherein the control panel 36 is positioned to the right of the upper end 32b of the lever body 32. By allowing for the adjustment of the position of the control panel 36 relative to the lever body 32 in this manner, accordingly an operator can reposition the control panel 32 as desired, thereby providing for improved operator comfort and flexibility of use of the control lever 30. While the illustrated embodiment shows the control panel 36 rotatably moveable about the control lever 30, it will be understood that the control panel 36 may be moveable in any suitable manner on the lever body 32, e.g. adjustable along a portion of the length of the lever body 32, between the base end 32a and the upper end 32b of the lever body 32.

In addition, the control lever 30 is provided with a locking device 40 which can comprise a simple push-button tab or sliding switch to prevent relative movement between the control panel 36 and the lever body 32, such that the control panel 36 can be held in position during operation of the tractor 10.

It will be understood that the control panel 36 may be moved to any number of other positions on the lever body 32, depending on the requirements and the construction of the control lever 30. For example, the control panel 36 may be positioned below the upper end 32b of the lever body 32, opposite to the position shown in FIG. 2B.

As a result of the repositioning of the control panel 36, the control lever 30 is configured such that the individual operating elements 38 of the control panel 36 can be re-configured or re-assigned to the control of different components of the tractor 10, based on the position of the control panel 36. Accordingly, the relative layout of the operating elements 38 as seen by an operator of the control lever 30 is maintained, regardless of the orientation of the control panel 36 relative to the lever body 32.

Figure 3A:
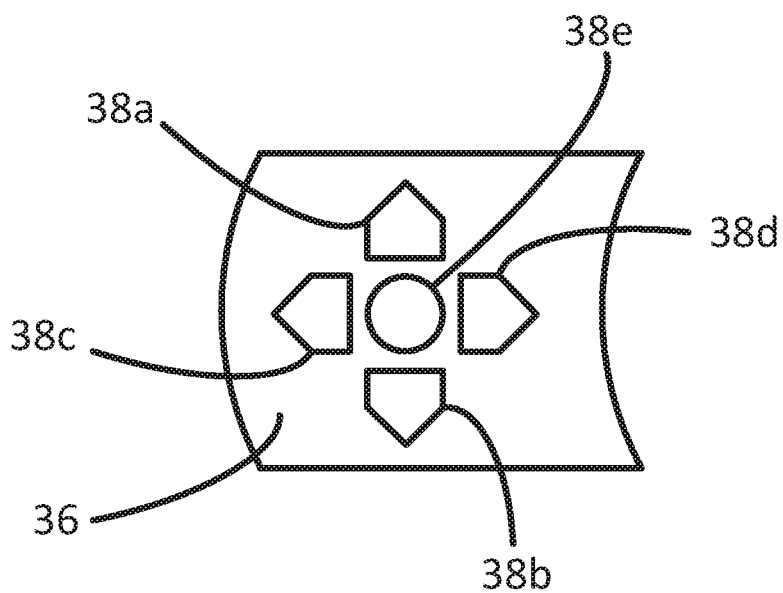
FIGS. 3A, 3B, and 3C illustrate enlarged views of the moveable control panel of the control lever of FIGS. 2A-2C when in different positions.
Figure 3B:
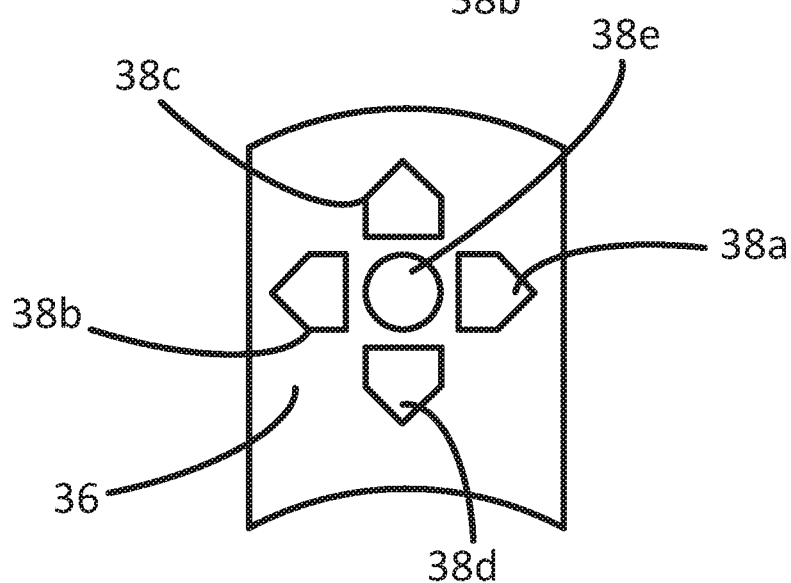
Figure 3C:
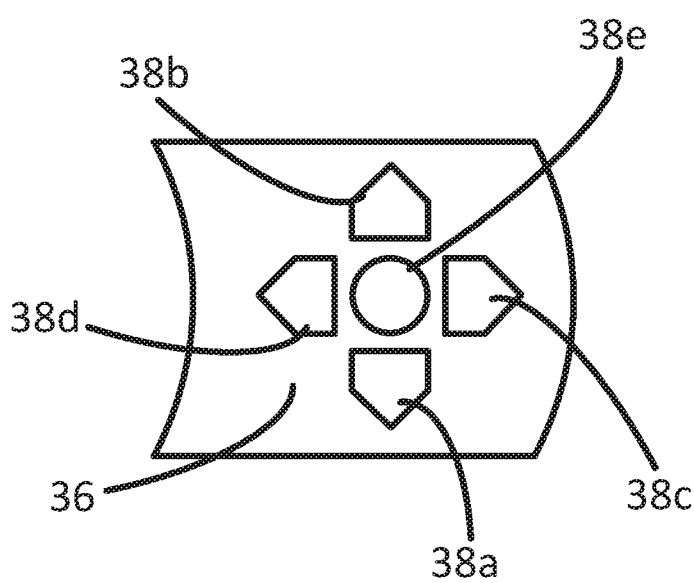

With reference to FIGS. 3A-3C, enlarged views are shown of the control panels 36 of FIGS. 2A-2C when in the left-side position (FIG. 3A), top- or front-side position (FIG. 3B) and right-side position (FIG. 3C). In each of the views, the control panel 36 is provided with an array of operating elements 38 in the form of buttons 38a, 38b, 38c, 38d, 38e arranged in a cross-shaped configuration.

When the control panel 36 is in the left-side position, an operator is presented with the layout as shown in FIG. 3A. Accordingly, the uppermost button 38a is preferably configured to control a vehicle function which would be associated with a forward or upwards direction, e.g. a raising of a front loader or hitch, to provide for ease of understanding by the operator. Similarly, the lowermost button 38b is configured to control a vehicle function which would be associated with a backwards or downwards direction, e.g. a lowering of a front loader or hitch. The leftmost button 38c is configured to control a vehicle function associated with a leftwards direction, while the rightmost button 38d is configured to control a vehicle function associated with a rightwards direction. Such directional controls may be associated with a steering function, or an incrementing features, e.g. wherein the rightmost button is linked with an increasing in a particular variable, and a leftmost button is linked with a decreasing of the variable.

If the operator desires to reposition the control panel 36 on the lever body 32, accordingly the control panel 36 can be rotated to the top- or front-side position shown in FIG. 3B. In this position, the operator is presented with an adjusted orientation of the control panel 36 and the operating elements 38a, 38b, 38c, 38d, 38e. Accordingly, the control lever 30 is configured such that the operating elements 38a, 38b, 38c, 38d are re-assigned to a control layout appropriate for the new orientation of the control panel 36. Button 38c, which was previously the leftmost button in FIG. 2A, is now positioned as the uppermost button, and accordingly is reconfigured to control the vehicle function associated with a forward or upwards direction. Button 38d, previously the rightmost button, is now configured to control the function associated with a backwards or downwards direction. Similarly, buttons 38a and 38b are reconfigured to control the right- and left-side functions respectively.

If the operator desires to further reposition the control panel 36 on the lever body 32, the control panel 36 can be rotated to the right-side position shown in FIG. 3C. In this case, the layout of the operating elements 38 is effectively inverted when compared with the layout of the left-side position shown in FIG. 3A. Accordingly, the control lever 30 is configured to further reassign the operating elements 38a,38b,38c,38d to control the downwards, upwards, rightwards, and leftwards vehicle functions respectively.

It will be understood that the reassignment of the operating elements 38 to control different vehicle functions may occur automatically, on detection of the movement of the control panel 36 to a different position. Additionally or alternatively, the reassignment may occur whenever the control panel 36 is locked in the new position, by use of the locking device 40. In a further aspect, the reassignment may be commenced by operator initiation of a reassignment button provided on the control lever 30, or a reassignment command through the user interface device 28.

By reassigning of vehicle control functions based on the position of the moveable control panel 36, the vehicle operator is presented with an operating element 38 layout which can more accurately correspond with the orientation of the control panel 36 as seen by the operator. As a result, the control lever 30 provides an input device having increased flexibility of operation, and which is more intuitively understood by a vehicle operator.

While the physical arrangement of the operating elements 38 shown in the embodiment of FIGS. 3A-3C are suitable for control of directionally-related functions, it will be understood that other physical arrangements of operating elements may be provided, which are suitable for control of a wide variety of different vehicle functions. For example, with reference to the features of the embodiment shown in FIGS. 4A-4C, a control panel 136 is illustrated having an array of equally-spaced and substantially identical operating elements indicated generally at 138. While the operating elements 138 of this embodiment may be used for the control of directionally-related functions as described above, such a regular array of operating elements 138 can be used for the control of more intricate vehicle functions, for example a numeric keypad for the entry of numerical values, as shown in FIGS. 4A-4C and described in more detail below.

Figure 5A:
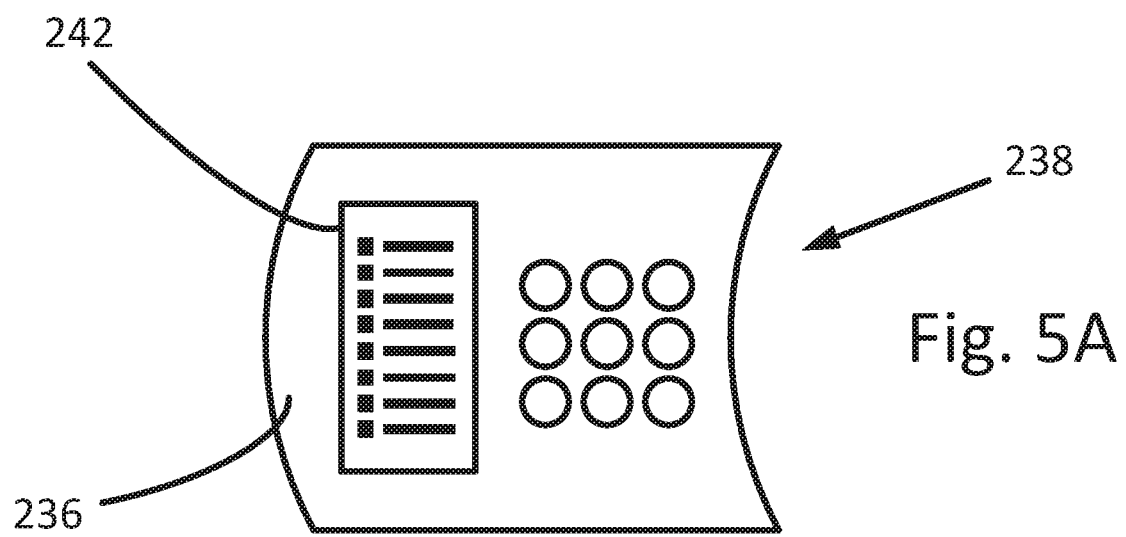
FIGS. 5A and 5B illustrate further embodiments of control panel for the control lever of FIGS. 2A-2C.

The assignment of the operating elements 38 of the control panel 36 may be displayed on a screen, e.g. using the user interface device 28, such that the operator understands the current layout of the vehicle functions associated with the individual operating elements 38. Additionally or alternatively, the assignment may be displayed on the control panel 36 itself. With reference to the embodiment illustrated in FIG. 5A, a control panel 236 is provided with an array of operating elements 238. In addition to the operating elements 238, the control panel is provided with an integrated display screen 242. The display screen 242 is configured to display the current configuration or assignment of the operating elements 238, for example listing the different vehicle functions currently controlled by the individual operating elements 238. Such display of information may comprise a textual listing of functions and/or a graphical display of icons.

In a further aspect, the individual operating elements may be provided with separate indicators which indicate the current configuration of the operating elements. For example, the indicators may comprise colour-changing lights, wherein different functions of the operating elements can be denoted by different colours of the colour-changing lights.

Figure 4A:
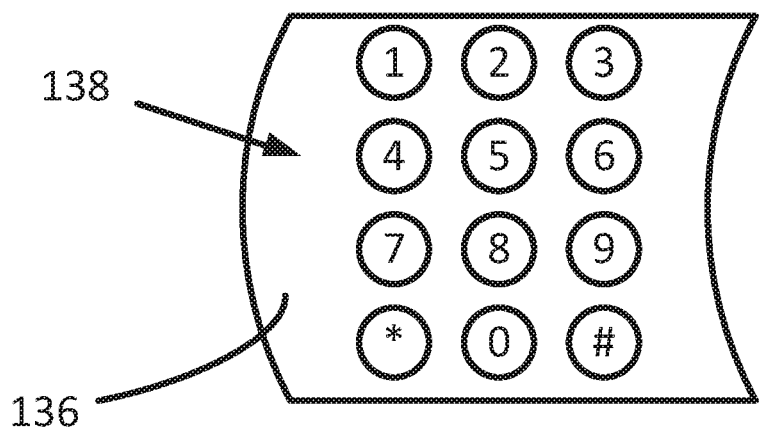
FIGS. 4A, 4B, and 4C illustrate enlarged views of another embodiment of moveable control panel of the control lever of FIGS. 2A-2C when in different positions.
Figure 4B:
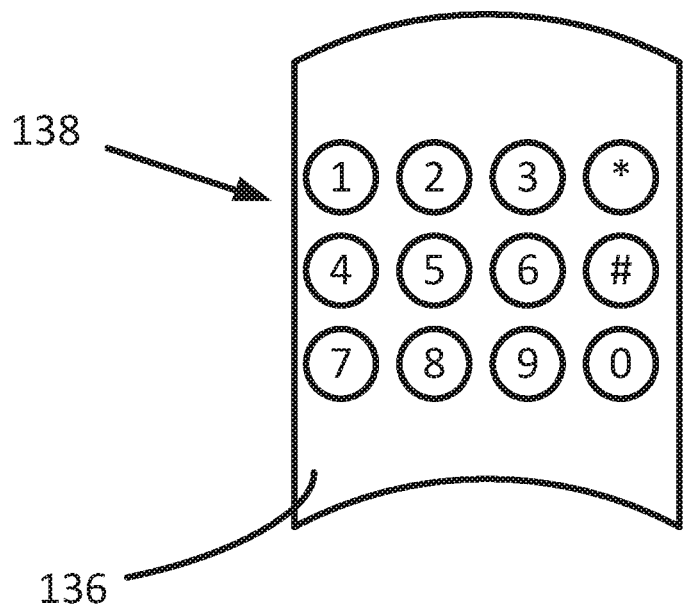
Figure 4C:
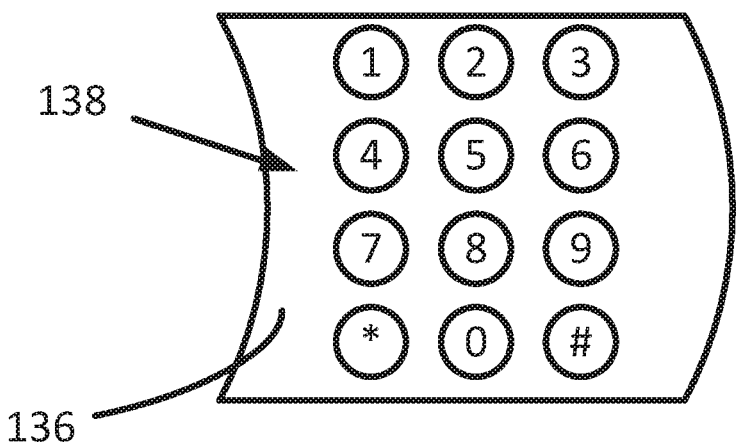

With reference to FIGS. 4A-4C, the features of a further embodiment of control lever according to the invention are illustrated. In this embodiment, a control panel 136 is provided with an array of operating elements 138. The individual operating elements 138 comprise individual display screens incorporated into the operating elements 138, wherein the individual display screens display an indication of the function currently controlled by each operating element 138. The display screens may comprise LCD or LED screens. In this instance, the control panel 136 is configured such that the operating elements 138 are used to provide a numerical keypad for numerical data entry, e.g. to enter process variables, desired speed limits, for interaction with an integrated telephone dialling system, etc. As with the embodiment of FIGS. 3A-3C, the control panel 136 can be moved from a left-side position (FIG. 4A) to a top- or front-side position (FIG. 4B), or to a right-side position (FIG. 4C), with the operating elements 138 reassigning to control different keypad elements based on the position of the control panel 136. In this case, the display screens incorporated into the operating elements 138 are configured to refresh to display the reassigned keypad configuration, when the control panel 136 is repositioned.

It will be noted that the operating elements 38,138 are preferably configured according to a layout of different operating functions controlled by the operating elements 38,138, wherein the layout of operating functions is changed based on the position of the control panel 36,136. The layout generally comprises a conventional component layout, e.g. four-way directional controls, keypad controls, etc., wherein the layout as applied to the operating elements of the control panel is adjusted based on the control panel position. With reference to the embodiment of FIGS. 3A-3C, the layout can be preserved due to the symmetrical layout of the operating elements 38. With reference to the embodiment of FIGS. 4A-4C, the layout as presented to the operator in the left- and right-side positions (FIGS. 4A and 4B) is preserved between the different orientations. In the top-side position (FIG. 4B) the layout is slightly altered to fit within the adjusted orientation of the operating elements 138, but which still presents substantially the same general impression when presented to the operator.

Figure 5B:
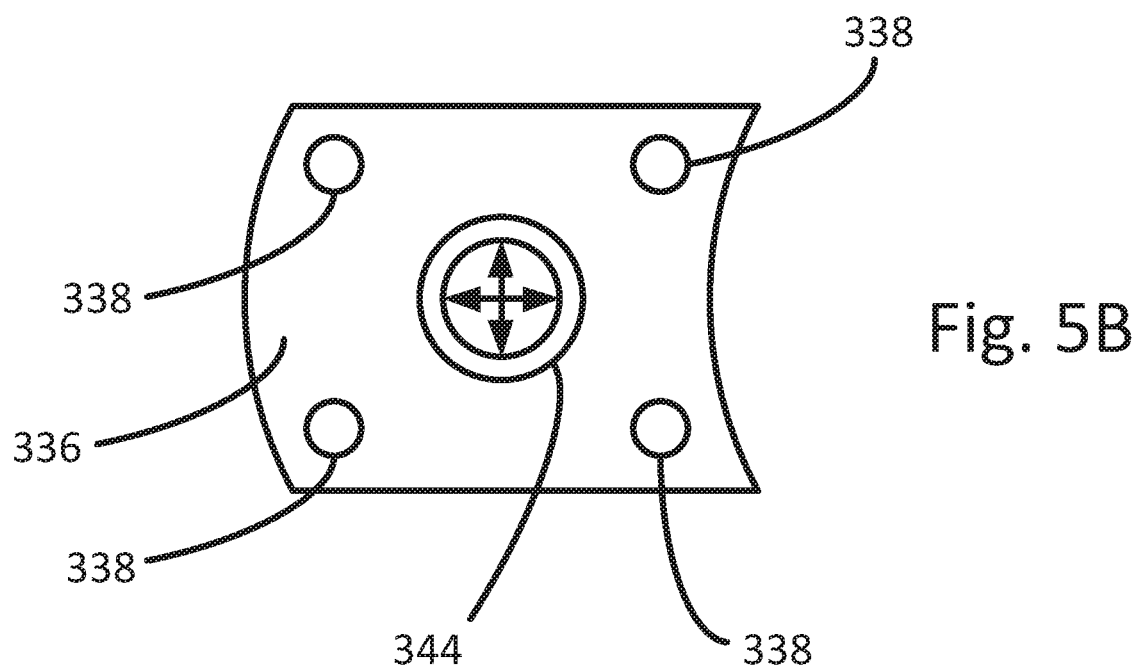

While the embodiments of FIGS. 3A-3C, 4A-4C and 5A illustrate the operating elements 38,138 as button elements, it will be understood that the operating elements may additionally or alternatively comprise any suitable control device, e.g. rotary dials, scroll wheels, cross-gate levers, mini-joysticks or thumbsticks, etc. For example, with reference to the enlarged view of FIG. 5B, a control panel 336 is provided with operating elements 338 in the form of pushbuttons. In addition, the control panel 336 is provided with a further operating element in the form of an adjustable mini-joystick 344. It will be understood that the mapping of the control of the mini-joystick 344 is adjusted based on the position of the control panel 336, such that the relative orientation of the mini-joystick 344 as presented to the operator is consistent with the associated control operations. For example, regardless of the position of the control panel 336, an actuation of the mini-joystick 334 in the leftwards direction will map to a control operation associated with the leftward actuation.

It will be understood that the control lever 30 may be provided with an integrated electronic control unit (ECU) to perform the re-assignment or re-configuration of the operating elements of the control panel based on the control panel position. Additionally or alternatively, the control lever 30 is arranged to interface with a vehicle ECU to perform the re-assignment or re-configuration.

Figure 6:
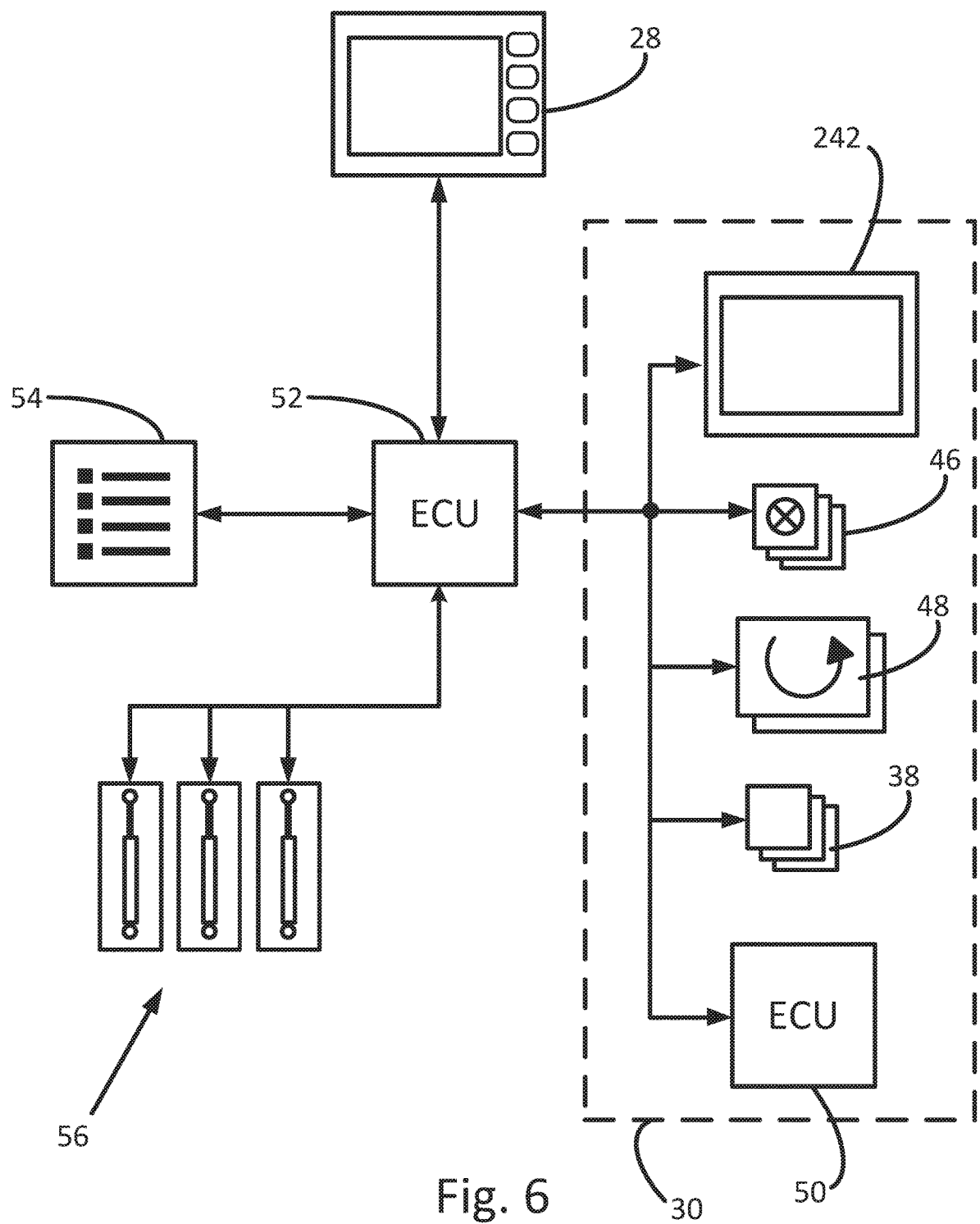
FIG. 6 illustrates an overview of a control scheme for a control lever according to the invention.

An overview of an embodiment of a control scheme for a control lever 30 is illustrated in FIG. 6. It will be understood that this overview is provided by way of example, and that individual embodiments may comprise different combinations of the illustrated features.

The components of the control lever 30 are indicated within the broken-line outline. The control lever 30 comprises an integrated general display 242, and/or individual integrated indicators or individual display screen elements 46 associated with individual operating elements 38 of the control panel. The display 242 and/or the individual integrated indicators or individual display screen elements 46 are controlled to indicate or display the current configuration of the operating elements 38 of the control lever 30.

The control lever 30 is further provided with at least one sensor 48, preferably at least one rotary sensor, which is arranged to detect the position of the control panel of the control lever 30. In the illustrated embodiment, the control lever 30 further comprises an integrated ECU 50 communicatively coupled with the integrated general display 242, the individual integrated indicators or individual display screen elements 46, and the at least one sensor 48.

The control lever 30 and associated components are communicatively coupled with a vehicle ECU 52 provided in the vehicle, e.g. tractor 10, for the control and operation of the vehicle functions. The ECU 52 is coupled with a memory storage module 54, which can be accessed to retrieve stored data, e.g. stored layouts of operating element configurations of the control lever. The ECU 52 is further coupled with the user interface device 28, for the input of commands from an operator as well as the display of information.

The ECU 52 is further coupled with a variety of individual vehicle functions, indicated generally at 56, for the control and operation of the vehicle functions 56. While the functions 56 are illustrated as hydraulic cylinders, it will be understood that the functions 56 to be controlled by the control lever may comprise any suitable vehicle system, e.g. steering, acceleration, navigation, implement control, etc. The user interface device 28 may be used by an operator to configure the assignment of the operating elements 38 of the control lever to different vehicle functions 56. For example, an operator can define different controller layouts to be used for the operating elements 38, wherein the controller layouts can be stored in the memory storage module 54 for later retrieval and use by the control lever 30.

As described above, the vehicle ECU 52 may be configured to perform the re-assignment of the operating elements of the control lever 30 to the different vehicle functions, based on the position of the control panel of the control lever 30 as detected by the at least one sensor 48. Such re-assignment may be performed in addition to, or as an alternative to, the integrated ECU 50.

In a further aspect of the invention, the ECU 50, 52 is operable to change the overall function of the operating elements of the control panel based on the position of the control panel. For example, when the control panel is in a first position, the control panel and the operating elements can be configured to control a first vehicle function, for example a first hydraulic circuit. When the control panel is moved to a second position, the configuration of the operating elements can be changed to control a different vehicle function, for example a second hydraulic circuit or a vehicle navigation system. By providing a relatively simple way to change between vehicle functions, the control lever provides an efficient way for an operator to switch between control of different aspects of the vehicle from the comfort of the control lever.

It will be understood that the control lever 30 may be provided with additional operating elements, e.g. trigger switches, additional buttons, wherein the additional operating elements may be provided about the lever body 32, e.g. on the head section 37.

The use of a control lever having a moveable control panel with re-assignable operating elements based on control panel position provides for a relatively simple and flexible input device for a vehicle.

The invention is not limited to the embodiments described herein, and may be modified or adapted without departing from the scope of the present invention.

The invention claimed is:

1. A control lever for a vehicle, the control lever comprising:

a lever body having a hand gripping surface, the lever body having a base end and an upper end, and a control panel mounted to said lever body, the control panel having configurable operating elements provided thereon, the control panel moveable about the lever body, wherein the operating elements are configured based at least in part on the position of the control panel relative to the lever body, wherein a plurality of the configurable operating elements are assigned to control directionally-related components of the vehicle, wherein said plurality are re-assigned based on the orientation of the control panel relative to the lever body when the control panel is moved about the lever body, such that the position of a re-assigned operating element corresponds to the respective direction of the assigned component.

2. The control lever of claim 1, wherein the control lever comprises at least one sensor arranged to detect the orientation of the control panel relative to the lever body, wherein the configuration of the operating elements is based on the detected orientation.

3. The control lever of claim 1, wherein the control lever comprises an integral controller or electronic control unit (ECU) to assign the operating elements to control or actuate different components of the vehicle.

4. The control lever of claim 1, wherein the control lever is arranged to interface with a vehicle controller or ECU, such that the vehicle controller or ECU can perform re-assignment of the operating elements of the control panel to different components of the vehicle.

5. The control lever of claim 1, wherein the control panel is positioned towards the upper end of the lever body, and wherein the control panel is rotatable about at least a portion of the circumference of the lever body.

6. The control lever of claim 1, wherein the position of the control panel is adjustable along at least a portion of a length of the lever body, between the base end and the upper end of the lever body.

7. The control lever of claim 1, wherein the control panel is lockable in position on the lever body.

8. The control lever of claim 7, wherein the control lever comprises a locking device, which can be operated to secure the control panel in position on the lever body.

9. The control lever of claim 1, wherein the control panel comprises a display screen to indicate the configuration of the operating elements.

10. The control lever of claim 1, wherein the operating elements of the control panel comprise changeable indicators or individual display screens which indicate the current configuration of the operating elements.

11. An agricultural vehicle or a constructional vehicle, having a control lever as claimed in claim 1.

* * * * *